United States Patent [19]

Nakano et al.

[11] Patent Number: 5,642,463
[45] Date of Patent: Jun. 24, 1997

[54] STEREOPHONIC VOICE RECORDING AND PLAYBACK DEVICE

[75] Inventors: Takahiko Nakano, Ikoma; Yasumoto Murata, Nara-ken, both of Japan

[73] Assignee: Sharp Kabushiki Kaisha, Osaka, Japan

[21] Appl. No.: 170,899

[22] Filed: Dec. 21, 1993

[30] Foreign Application Priority Data

Dec. 21, 1992 [JP] Japan .................. 4-340777
Mar. 1, 1993 [JP] Japan .................. 5-039778

[51] Int. Cl.$^6$ .................................. G10L 3/02
[52] U.S. Cl. .................................. 395/2.1
[58] Field of Search .................. 381/3, 22, 23, 381/32; 358/141, 41; 375/98; 330/253; 379/386; 395/2.1

[56] References Cited

U.S. PATENT DOCUMENTS

| | | | |
|---|---|---|---|
| 4,817,167 | 3/1989 | Gassmann | 381/3 |
| 4,910,780 | 3/1990 | Miki | 381/32 |
| 4,926,138 | 5/1990 | Castello et al. | 330/253 |
| 4,965,674 | 10/1990 | Nagasawa et al. | 358/41 |
| 5,184,219 | 2/1993 | Cho | 358/141 |
| 5,291,525 | 3/1994 | Funderburk et al. | 375/98 |
| 5,392,348 | 2/1995 | Park et al. | 379/386 |

FOREIGN PATENT DOCUMENTS

| | | |
|---|---|---|
| 55-17850 | 2/1980 | Japan . |
| 55-58815 | 5/1980 | Japan . |

*Primary Examiner*—Allen R. MacDonald
*Assistant Examiner*—Thomas J. Onka

[57] ABSTRACT

A stereophonic voice recording and playback device for stereophonically recording and reproducing voice signals, includes: an adding circuit for receiving a first channel analog voice signal and a second channel analog voice signal, performing orthogonal conversion of the respective analog voice signals, and adding the orthogonally converted signals; an Analog-to-Digital (A/D) converter for receiving the added signal from the adding circuit and converting the added signal to a digital signal; a compressing circuit for receiving the digital signal from the A/D converter and compressing the digital signal; a memory circuit for storing the compressed digital signal; and an expanding circuit for reading out the digital signal from the memory circuit and reproducing a stereophonic signal.

6 Claims, 19 Drawing Sheets

ANALOG SIGNAL

MODULATION SIGNAL

DEMODULATION SIGNAL

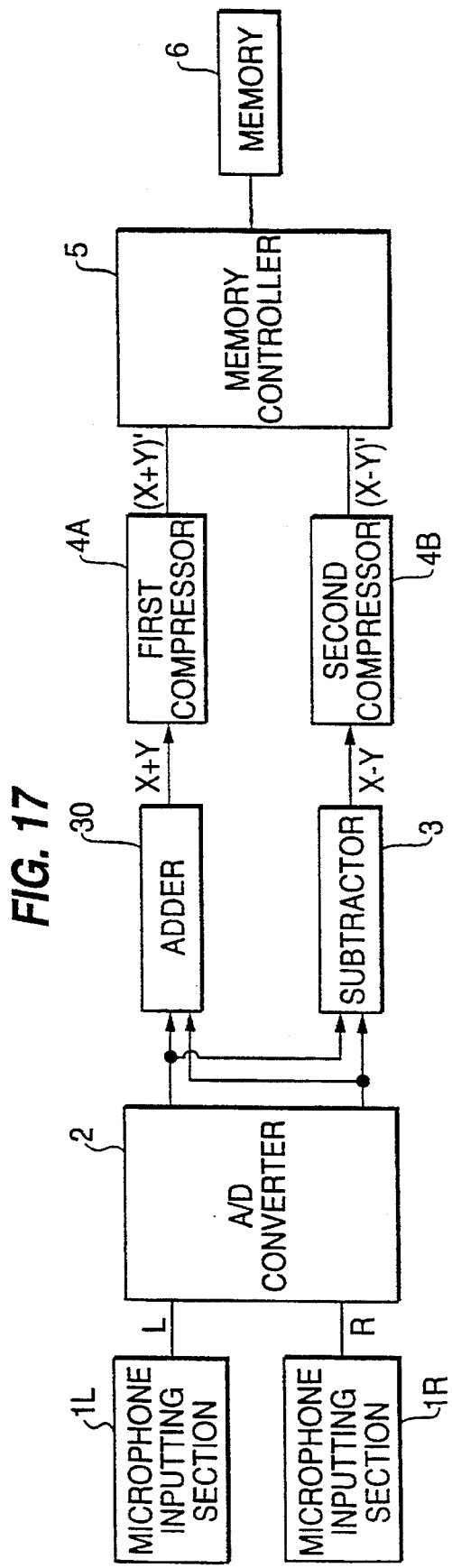

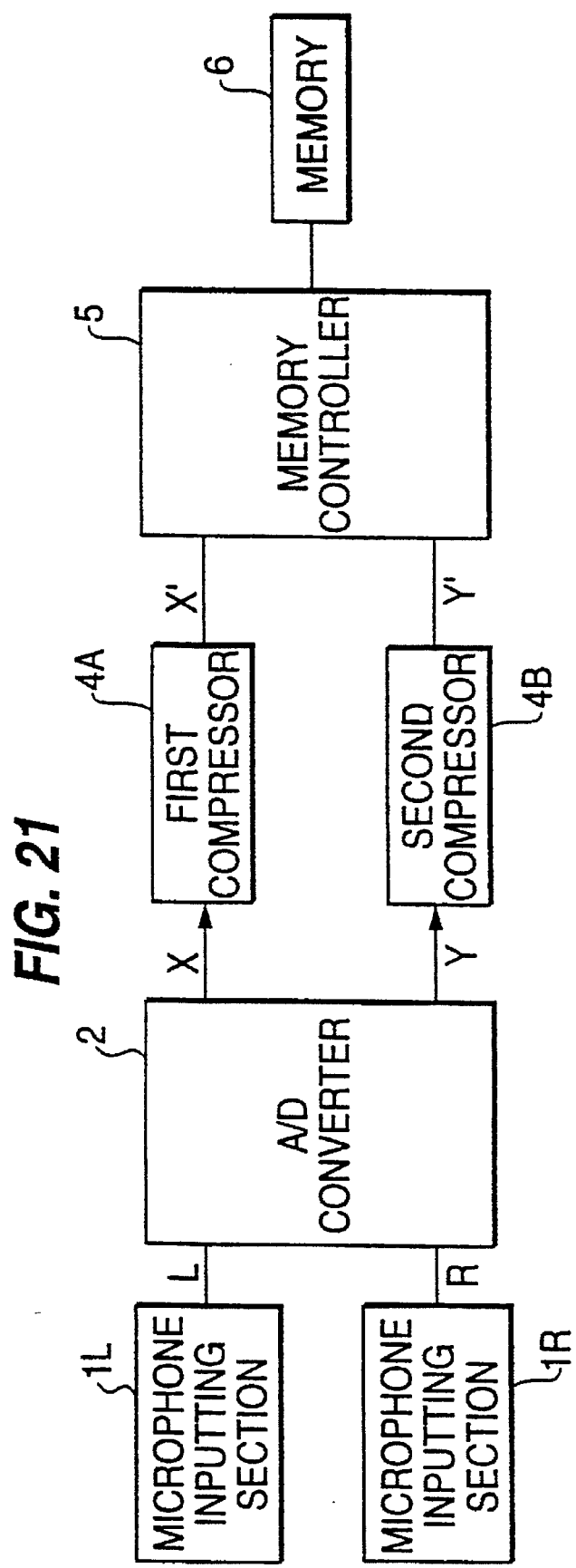

STEREOPHONIC VOICE RECORDING AND PLAYBACK DEVICE

BACKGROUND OF THE INVENTION

1. Field of the Invention

The present invention relates to a stereophonic voice recording and playback device for recording a voice signal on a solid-state recording medium such as a semiconductor memory and for reproducing such recorded information as a voice signal. And more particularly, the present invention relates to a solid-state stereophonic voice recording and playback device suitable for use as a stereophonic conference dictating machine.

2. Description of the Related Art

FIGS. 1 and 2 show a recording section and a playback section, respectively, for a conventional voice recording and playback device such as disclosed by Japanese Laid-Open Patent Publication No. 55-58815.

Hereinafter, the configuration and operation of the conventional voice recording and playback device will be described. First, an analog waveform representing a voice signal serves as an analog input signal which is sampled by a sampling circuit 100 at a predetermined sampling rate. The sampled values are supplied to an Analog-to-Digital (A/D) converter 101, where the sampled analog waveform is converted to a digital signal. The digital signal is subsequently supplied to an information compressing circuit 102, where the digital signal data is compressed in accordance with a predetermined compression procedure. The compressed data is then written into and stored in a voice information recording section 111 of a solid-state record section 110. At this time, information to indicate a reconstruction procedure corresponding to the compression procedure used by the information compressing circuit 102 is written to and stored in a reconstruction procedure recording section 112 of the solid-state record section 110.

The solid-state record section 110 further includes a controller 113. To reproduce data, the data stored in the voice information recording section 111 is read out, and then the original data before compression is reconstructed using the controller 113 in accordance with the reconstruction procedure information stored in the reconstruction procedure recording section 112. Thereafter, the reconstructed data is supplied to a Digital-to-Analog (D/A) converter 120, where it is converted to the original analog voice signal, and subsequently it is outputted to a speaker section.

According to the above-described voice recording and playback device, only a monophonic voice signal can be recorded and reproduced. A position from which a voice originates cannot be ascertained, such as is possible with a stereophonic voice recording and playback device. Therefore, a conventional voice recording and playback device as described above cannot be applied to a conference dictating machine which enabled us to recognize a position of each speaker for readily determining who speaks.

Even though it is possible to record and reproduce a stereophonic voice signal by modifying the above voice recording and playback device according to conventional techniques, there arises a problem of a high production cost. Such modification for providing stereophonic recording and playback necessitates each of two circuits 100 and 102 and converters 101 and 120 and at least one solid-state record section 110. According to such a configuration, the required information content is doubled, which disadvantageously decreases the recording and playback time to one-half. That is, the required memory capacity of the solid-state record section 110 is increased twice as much as that of the stereophonic voice recording and playback device for recording and reproducing data providing the same amount of recording time. For the above reasons, when the conventional voice recording and playback device is used for recording and reproducing the stereophonic voice signal, the configuration thereof becomes complicated and thus the production cost is significantly increased.

FIG. 3 shows a conventional method for converting analog signals in two channels to digital signals using a single A/D converter, such as disclosed in Japanese Laid-Open Patent Publication No. 55-17850.

In FIG. 3, the analog signals L and R in the corresponding two channels are inputted to low-pass filters 71 and 71', respectively. The outputs of the low-pass filters 71 and 71' are inputted to sample and hold (S/H) circuits 72 and 72', respectively, where each analog value is sampled and held, at a predetermined sampling rate, and outputted to an analog switch 73. Using the analog switch 73, the sampled signals L and R are alternately outputted to an A/D converter 74, where they are converted to digital signals in alternating order such as $L_n$, $R_n$, $L_{n+1}$, $R_{n+1}$, .... That is, the digital signals of $L_i$ and $R_i$ are alternately outputted.

To sample the signals L and R at a frequency of $F_s$ Hz, the S/H circuits 72 and 72' should be operated at the frequency of $F_s$ Hz, and the analog switch 73 should be operated at a frequency of $2 \times F_s$ Hz. Accordingly, the A/D converter 74 should have a band width of $2 \times F_s$ Hz, and thus the A/D converter 74 is required to be operated at a high speed with high precision. However, according to this A/D converter 74, the signals L and R are alternately converted, so that samples from the same signal cannot successively be converted. Therefore, a delta-sigma modulation type A/D converter including a delay circuit cannot be used for this purpose even though such a delta-sigma modulation type A/D converter, which employs a primarily digital circuit technique, not requiring a high-precision analog circuit technique in order to achieve high-precision A/D conversion without requiring adjustment, is very useful for an integrated circuit.

SUMMARY OF THE INVENTION

According to one aspect of the present invention, a stereophonic voice recording and playback device is provided for stereophonically recording and reproducing voice signals, including:

an adding circuit for receiving a first channel analog voice signal and a second channel analog voice signal, performing quadrature conversion of the respective analog voice signals, and adding the orthogonally converted signals to produce an added signal, an Analog-to-Digital (A/D) converter for receiving the added signal from the adding circuit and converting the added signal to a digital signal, a compressing circuit for receiving the digital signal from the A/D converter and compressing the digital signal, a memory circuit for storing the compressed digital signal, and an expanding circuit for accessing the digital signal from the memory circuit and reproducing a stereophonic signal.

In one embodiment of the invention, the A/D converter, the compressing circuit, the memory circuit, and the expanding circuit are integrated on the same substrate.

In one embodiment of the invention, the A/D converter is of delta-sigma modulation type.

In one embodiment of the invention, the stereophonic voice recording and playback device further includes a circuit for dividing the digital signal converted by the A/D converter into a digital signal corresponding to the first channel voice analog signal and a digital signal corresponding to the second channel voice analog signal. In addition, the compressing circuit includes:

> a compressing section for compressing one of the two digital signals,
>
> a differential calculating circuit for calculating the difference between the two digital signals,
>
> a differential compressing section for compressing the difference calculated by the differential calculating circuit, and
>
> a data writing circuit for writing data compressed by the compressing section and data compressed by the differential compressing section into the memory circuit.

In one embodiment of the invention, the compression ratio of the compressing section and the compression ratio of the differential compressing section is different from each other.

In one embodiment of the invention, the stereophonic voice recording and playback device further includes a circuit for dividing the digital signal converted by the A/D converter into a digital signal corresponding to the first channel analog voice signal and a digital signal corresponding to the second channel analog voice signal. In addition, the compressing circuit includes:

> an adding circuit for calculating the sum of the two digital signals,
>
> a sum compressing section for compressing the sum calculated by the adding circuit,
>
> a differential calculating circuit for calculating the difference between the two digital signals,
>
> a differential compressing section for compressing the difference calculated by the differential calculating circuit, and
>
> a data writing circuit for writing data compressed by the sum compressing section and data compressed by the differential compressing section into the memory circuit.

In one embodiment of the invention, the data writing circuit writes both of the data compressed by the compressing section and the data compressed by the differential compressing section into one address in the memory.

In one embodiment of the invention, the data writing circuit writes both of the data compressed by the sum compressing section and the data compressed by the differential compressing section into one address in the memory circuit.

In one embodiment of the invention, the stereophonic voice recording and playback device further includes a data reading circuit for reading out the data compressed by the compressing section and the data compressed by the differential compressing section both written into one address in the memory circuit.

In one embodiment of the invention, the stereophonic voice recording and playback device further includes a data reading circuit for reading out the data compressed by the sum compressing section and the data compressed by the differential compressing section both written into one address in the memory circuit.

In one embodiment of the invention, the expanding circuit includes:

> a data reading circuit for reading out the data compressed by the sum compressing section and the data compressed by the differential compressing section written into the memory circuit,
>
> a first expanding section and a second expanding section for independently expanding the data compressed by the sum compressing section and the data compressed by the differential compressing section read out from the data reading circuit, and
>
> a differential calculating circuit for calculating the difference between data expanded by the first expanding section and data expanded by the second expanding section.

In one embodiment of the invention, the expanding circuit includes:

> a data reading circuit for reading out the data compressed by the sum compressing section and the data compressed by the differential compressing section written into the memory circuit,
>
> a first expanding section and a second expanding section for independently expanding the data compressed by the sum compressing section and the data compressed by the differential compressing section read out from the data reading circuit,
>
> a differential calculating circuit for calculating the difference between data expanded by the first expanding section and data expanded by the second expanding section, and
>
> a sum calculating circuit for calculating the sum of the data expanded by the first expanding section and the data expanded by the second expanding section.

In one embodiment of the invention, the compression ratio of the first expanding section and the compression ratio of the second expanding section is different from each other.

Thus, the invention described herein makes possible the advantages of (1) providing a stereophonic voice recording and playback device capable of providing long duration stereophonic recording and playback, and which can be applied to a communication recording and playback device such as a dictating machine; (2) providing a stereophonic voice recording and playback device with a simplified configuration and a low production cost; and (3) providing a stereophonic A/D converting circuit to be used as a delta-sigma modulation type A/D converter.

These and other advantages of the present invention will become apparent to those skilled in the art upon reading and understanding the following detailed description with reference to the accompanying figures.

BRIEF DESCRIPTION OF THE DRAWINGS

FIG. 17 is a block diagram showing a circuit configuration for a recording section for a stereophonic dictating machine according to a second example of the present invention.

FIG. 21 is a block diagram showing a circuit configuration for a recording section for a stereophonic dictating machine according to a third example of the present invention.

DESCRIPTION OF THE PREFERRED EMBODIMENTS

Hereinafter, the present invention will be described by way of illustrating preferred embodiments and examples according thereto with reference to the drawings.

Figure 4:
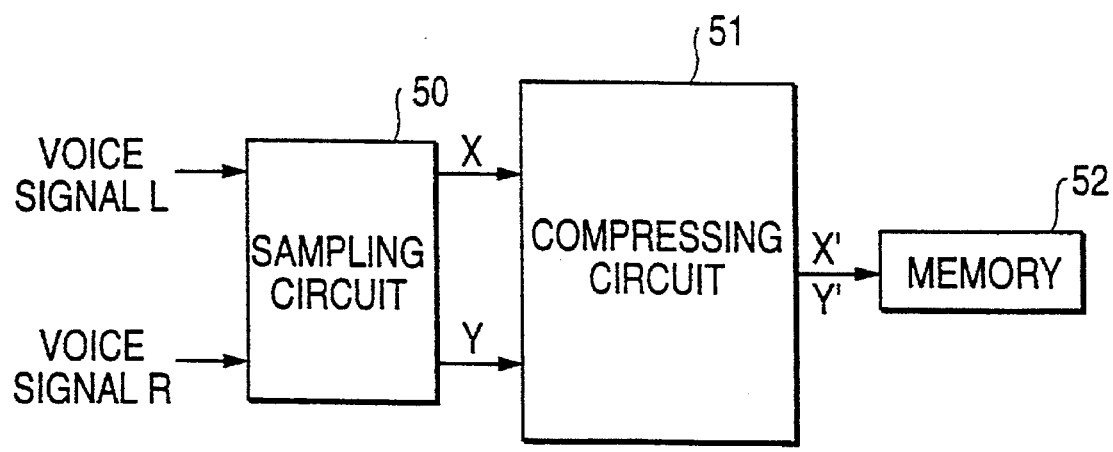
FIG. 4 is a block diagram illustrating a recording section for a solid-state stereophonic voice recording and playback device according to a first embodiment of the present invention.
Figure 5:
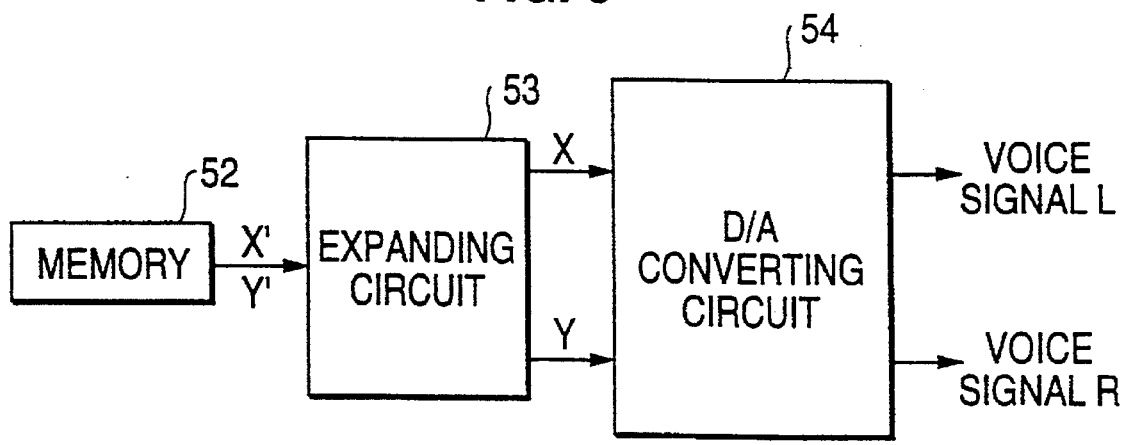
FIG. 5 is a block diagram illustrating a playback section for the solid-state stereophonic voice recording and playback device according to the first embodiment.

FIGS. 4 and 5 show an exemplary recording section and a playback section, respectively, for a stereophonic voice recording and playback device according to a first embodiment of the present invention.

Initially, a recording operation for the stereophonic voice recording and playback device will be described referring to FIG. 4.

First, stereophonic voice signals L and R are produced as is conventional by a left microphone and a right microphone, respectively, in response to speech sound, and then the voice signals L and R are inputted to a sampling circuit 50, where the input signals L and R (analog signals) are sampled and converted to digital signals X and Y, respectively. For example, each of the digital signals X and Y has 10 bit or more. The digital signals X and Y are subsequently inputted to a compressing circuit 51, where they are compressed in accordance with a compression method, such as Adaptive Differential Pulse Code Modulation, thereby obtaining compressed data X' and Y'.

The compressed data X' and Y' are written into a location at a selected address in a memory 52. For example, the compressed data X' is written into a more significant bits portion, and the compressed data Y' is written into a less significant bits portion. Thus, the compressed data X' and Y' are recorded in the memory 52.

Next, a playback operation for the stereophonic voice recording and playback device will be described with reference to FIG. 5.

The compressed data X' and Y' stored in the location of the selected address in the memory 52 are read out by an expanding circuit 53, and then are expanded in accordance with an expansion method corresponding to the above compression method, thereby obtaining the original digital signals X and Y before compression. Subsequently, the obtained digital signals X and Y are converted to the original analog voice signals L and R using a D/A converter 54.

Next, a method for converting the stereophonic voice signals L and R to the digital signals X and Y according to the present invention will be described with reference to FIG. 6. For simplification of description, a filter to remove unwanted frequency components, and the like, and not affecting the effects of the present invention, are omitted in FIG. 6.

The analog signal L is multiplied by a COS wave outputted from a sine wave generating circuit 62 using a multiplier 61 (quadrature conversion). On the other hand, the analog signal R is multiplied by a SIN wave outputted from the sine wave generating circuit 62 using a multiplier 61' (quadrature conversion). The COS wave and the SIN wave each have a frequency of w which is set higher than the highest frequency of signals L and R. The output of the multiplier 61 is: L×COS (wt), and that of the multiplier 61' is: R×SIN (wt). The outputs from the multipliers 61 and 61' are inputted to an adder 63. The output $S1_{out}$ of the adder 63 is represented by the following equation (1):

$$S1_{out} = L \times COS(wt) + R \times SIN(wt) \tag{1}$$

Figure 7A:
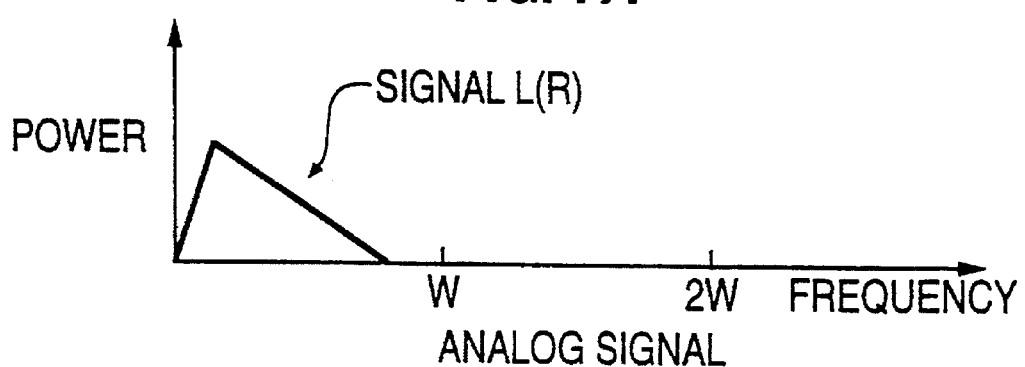
FIGS. 7A to 7C show the frequency spectrum of signals according to the method for converting analog signals to digital signals in accordance with the present invention.
Figure 7B:
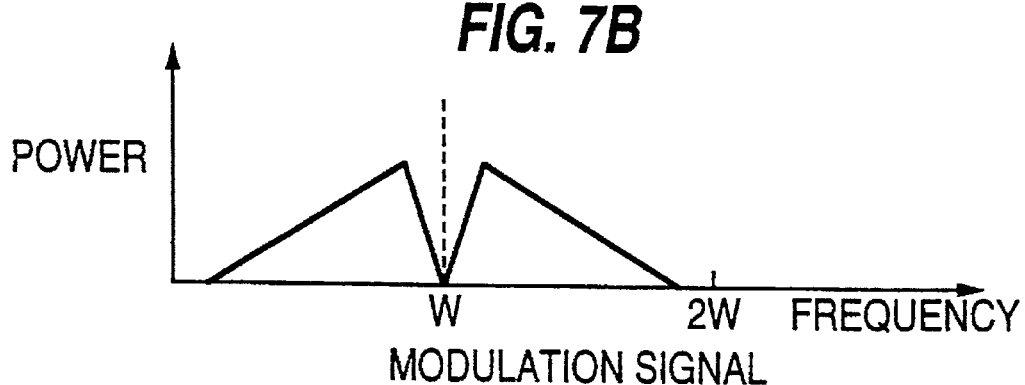

The frequency spectrum of the signals L and R and the output $S1_{out}$ of the adder 63 are shown in FIGS. 7A and 7B, respectively. Assuming for the sake of example that each of the signals L and R has frequency spectrum as shown in FIG. 7A, the output $S1_{out}$ of the adder 63 (i.e., the modulated signals) has a frequency spectrum as shown in FIG. 7B. Thus, the bandwidth (2×w) of the output $S1_{out}$ of the adder 63 is about twice the bandwidth of each signal L or R.

Figure 6:
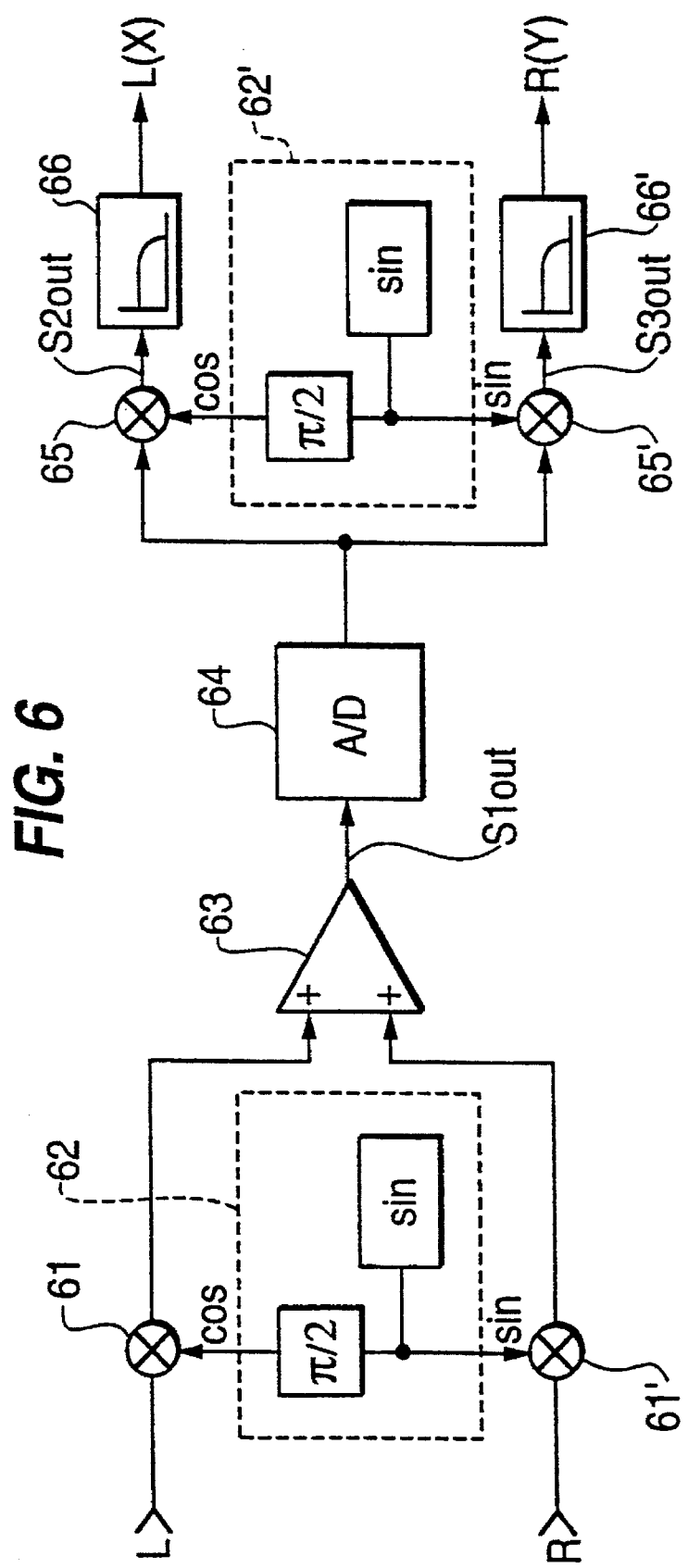
FIG. 6 is a block diagram illustrating a circuit for converting analog signals to digital signals according to the present invention.

As shown in FIG. 6, the output $S1_{out}$ of the adder 63 is inputted to a single A/D converter 64 to produce a digital signal representing digital output of the adder 63. The digital signal produced by the A/D converter 64 is a sampled and quantized signal, but herein it is assumed to be equivalent to the signal represented by the above equation (1) for simplification of description. To separate the signal represented by the equation (1) into original signals and isolate the signal L, the A/D converted signal is multiplied by a COS wave having a frequency of w with a multiplier 65 and another sine wave generating circuit 62'. The resulting output $S2_{out}$ which is represented by the following equation (2) is then inputted to a low-pass filter 66 having a bandwidth of w.

$$\begin{aligned} S2_{out} &= \{A/D \text{ converted } S1_{out}\} \times \text{COS (wt)} \quad (2) \\ &= \{L \times \text{COS (wt)} + R \times \text{SIN (wt)}\} \times \text{COS (wt)} \\ &= L \times \text{COS}^2 \text{(wt)} + R \times \text{SIN (wt)} \times \text{COS (wt)} \\ &= \{L + L \times \text{COS (2} \times \text{wt)} + R \times \text{SIN (2} \times \text{wt)}\}/2 \end{aligned}$$

Figure 7C:
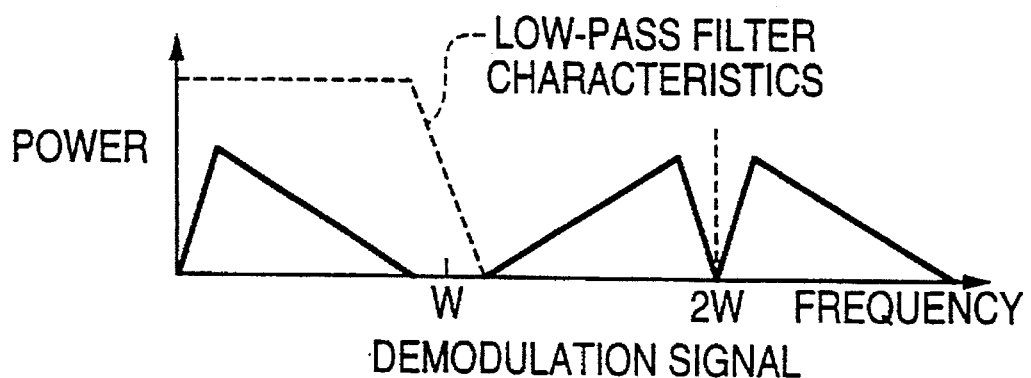

At this stage, the frequency spectrum of the output $S2_{out}$ of the multiplier 65 is shown in FIG. 7C, where the original signal L alone remains in the band not higher than the frequency of w. Accordingly, by passing the output $S2_{out}$ of the multiplier 65 through the low-pass filter 66 having the band of w, the signal L can be obtained.

Similarly, to obtain the signal R, the output signal of the A/D converter 64 is multiplied by the SIN wave having a frequency of w outputted from the sine wave generating circuit 62', using a multiplier 65'. Then, the resulting output $S3_{out}$ represented by the following equation (3) is inputted to a low-pass filter 66' having a band of w. That is, the multiplier 65' and the low-pass filter 66' are used for obtaining the digital signal R.

$$S3_{out} = \{R - R \times \text{COS (2} \times wt) + L \times \text{SIN (2} \times wt)\}/2 \quad (3)$$

Figure 8:
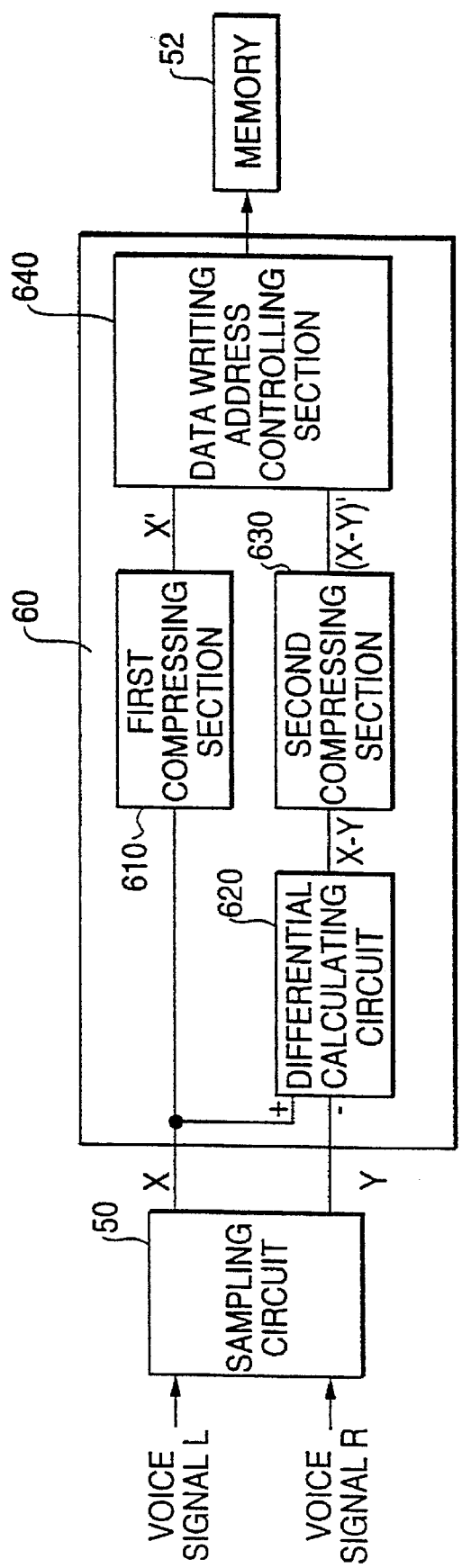
FIG. 8 is a block diagram illustrating a recording section for the solid-state stereophonic voice recording and playback device according to a second embodiment of the present invention.
Figure 9:
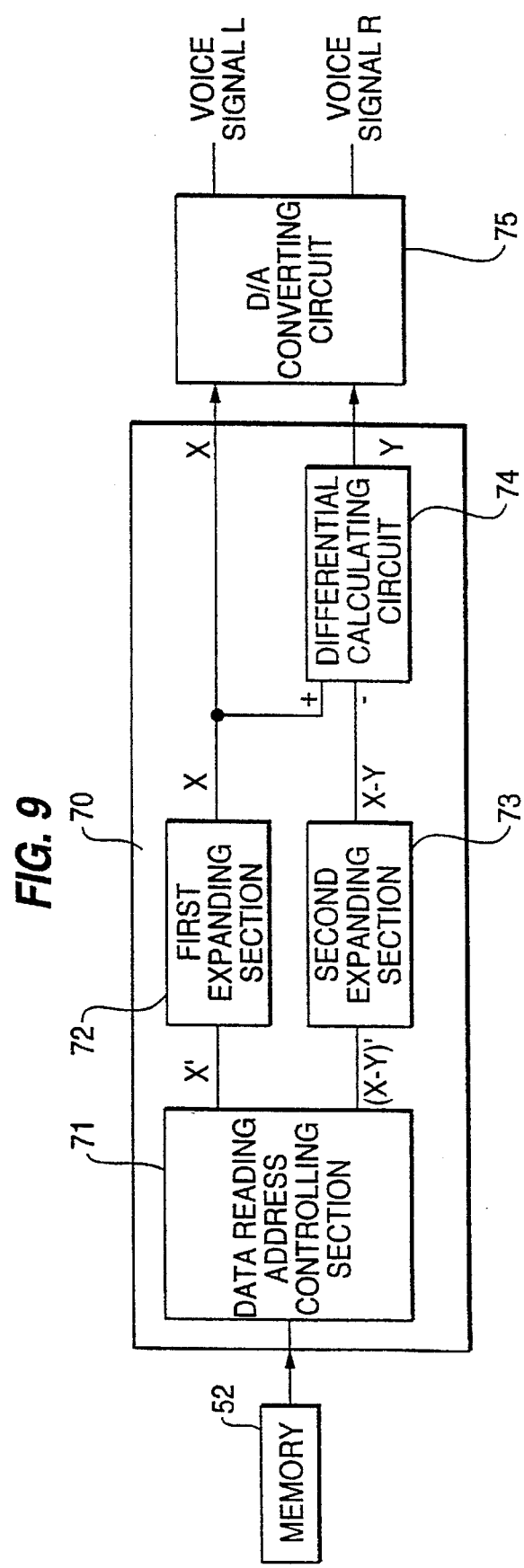
FIG. 9 is a block diagram illustrating a playback section for the solid-state stereophonic voice recording and playback device according to the second embodiment.

FIGS. 8 and 9 show an exemplary recording section and a playback section, respectively, for a stereophonic voice recording and playback device according to a second embodiment of the present invention.

Hereinafter, a recording operation for the stereophonic voice recording and playback device will be described referring to FIG. 8.

First, stereophonic voice signals L and R are produced conventionally by a left microphone and a right microphone, respectively, in response to speech sound, and then the voice signals L and R are inputted to a sampling circuit 50, where the input signals L and R (analog signals) are sampled and converted to digital signals X and Y, respectively. The digital signals X and Y are inputted to a compressing circuit 60. The compressing circuit 60 includes a first compressing section 610, a second compressing section 630, a differential calculating circuit 620, and a data writing address controlling section 640.

First, the differential calculating circuit 620 calculates the difference (X-Y) between the digital signals X and Y. The thus calculated result (X-Y) is inputted to the second compressing section 630. On the other hand, the digital signal X from the sampling circuit 50 is inputted to the first compressing section 610.

By the first and second compressing sections 610 and 630, the digital signal X and the differential digital signal (X-Y) are each compressed, respectively, in accordance with a compression method, such as Adaptive Differential Pulse Code Modulation, thereby obtaining compressed data X' and (X-Y)'.

The compressed data X' and (X-Y)' are inputted to the data writing address controlling section 640. The digital signals X and Y which, for example, originate from the same voice sounds, are correlated with each other to some extent. Therefore, an information content of the digital differential signal (X-Y) is less than that of the digital signal X. Therefore, the second compressing section 630 can perform the compression process using less bits compared with the first compressing section 610, and therefore the compression ratio of the second compressing section 630 is higher than that of the first compressing section 610. Thus, compared with the case using two compressing sections having the same compression ratio, this configuration advantageously makes it possible to make recording and playback time longer using the same memory capacity.

As a result of the data writing address controlling section 640, the compressed data X' and (X-Y)' are written into a location of a selected address in a memory 52. For example, the compressed data X' is written into a more significant bits portion, and the compressed data (X-Y)' is written into a less significant bits portion. Thus, the compressed data X' and (X-Y)' are recorded in the memory 52.

Next, a playback operation for the stereophonic voice recording and playback device will be described referring to FIG. 9.

The compressed data X' and (X-Y)' written into the location of the selected address in the memory 52 are read out by an expanding circuit 70, and the original digital signals X and Y before compression are reconstructed. The expanding circuit 70 includes a data reading address controlling section 71, a first expanding section 72, a second expanding section 73, and a differential calculating circuit 74.

First, the data reading address controlling section 71 reads out the compressed data X' and (X-Y)' from the memory 52, and then the compressed data X' is outputted to the first expanding section 72, and the compressed data (X-Y)' is outputted to the second expanding section 73. By the first and second expanding sections 72 and 73, the compressed data X' and (X-Y)' are expanded in accordance with an expansion method corresponding to the above-referenced compression method of the first and second compressing sections 610 and 630, thereby obtaining the original digital signals X and (X-Y) before compression. The compression ratio of the second expanding section 73 corresponding to the second compressing section 630 is higher than that of the first expanding section 72 corresponding to the first compressing section 610.

The reconstructed digital signal X is outputted from the first expanding section 72 to a D/A converting circuit 75 and the differential calculating circuit 74. The reconstructed digital signal (X-Y) is outputted from the second expanding section 73 to the differential calculating circuit 74.

The differential calculating circuit 74 subtracts the digital signal (X-Y) from the digital signal X to obtain the digital signal Y. Thereafter, the digital signal Y obtained by the differential calculating circuit 74 is outputted to the D/A converting circuit 75. Accordingly, the D/A converting circuit 75 receives the digital signals X and Y which are to be converted to the analog voice signals L and R. Then, the digital signals X and Y are D/A converted using the D/A converting circuit 75, thereby reproducing and outputting the original voice signals L and R.

As is described above, by writing both of the compressed data X' and (X-Y)' to a single location of the selected address in the memory 52, it is possible to readily control the data writing operation and data reading operation.

Figure 10:
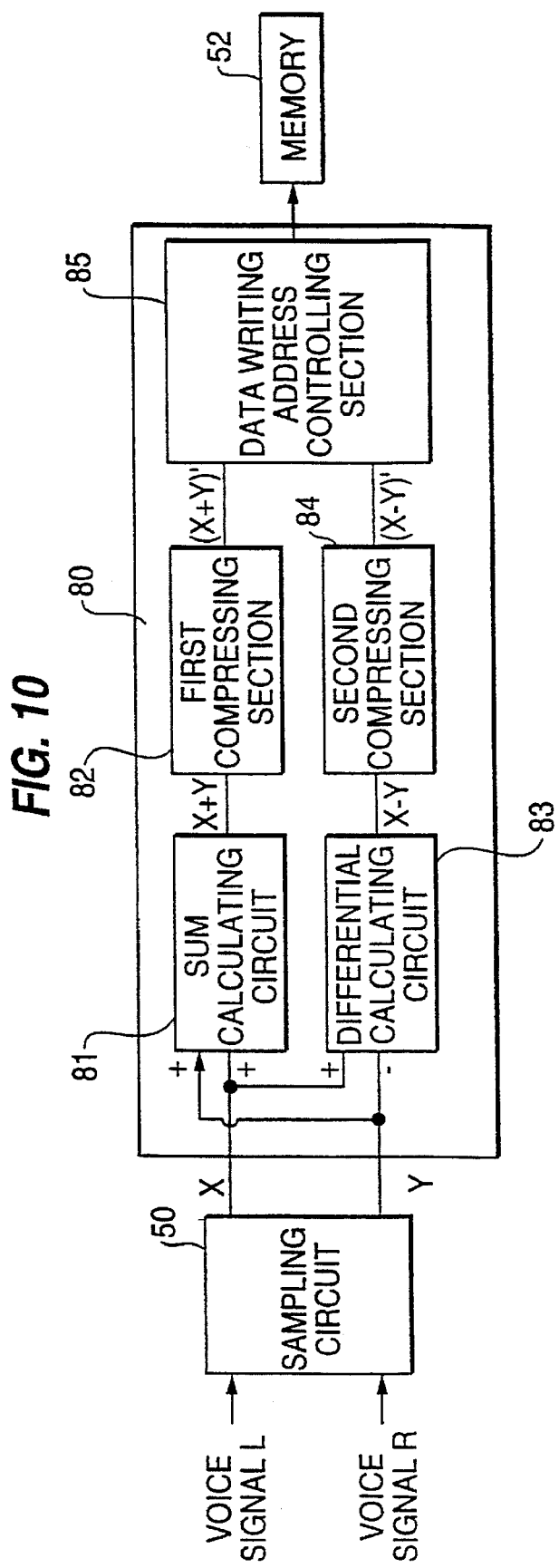
FIG. 10 is a block diagram illustrating a recording section for the solid-state stereophonic voice recording and playback device according to a third embodiment of the present invention.
Figure 11:
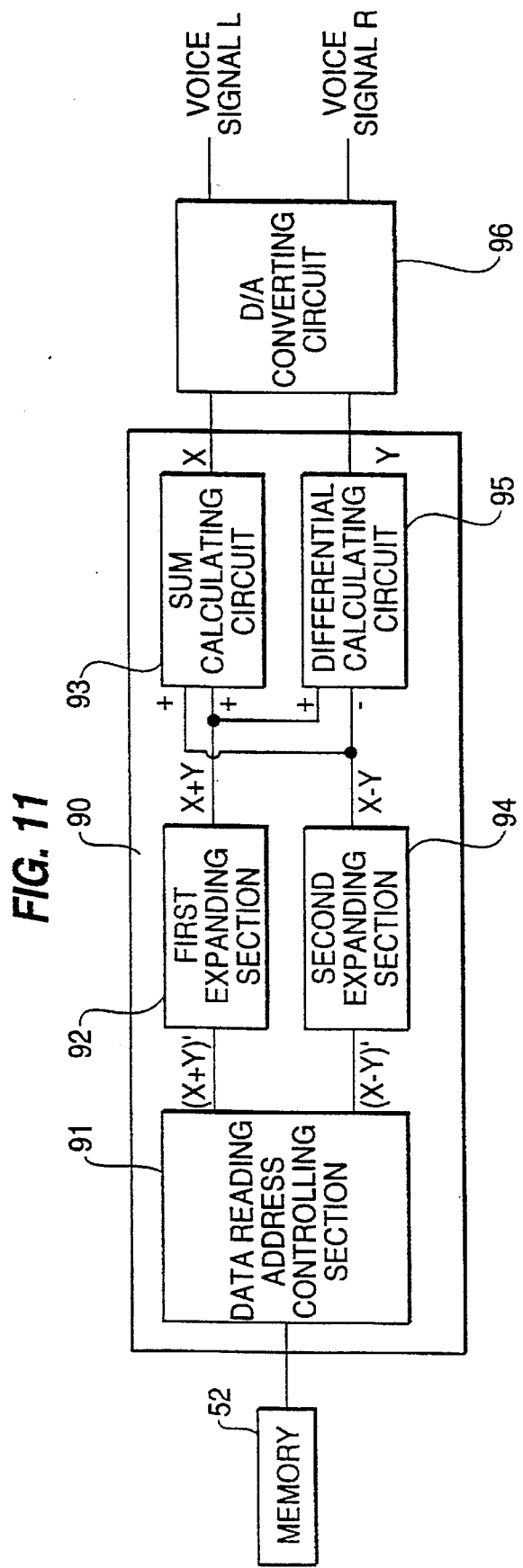
FIG. 11 is a block diagram illustrating a playback operation for the solid-state stereophonic voice recording and playback device according to the third embodiment.
Figure 12:
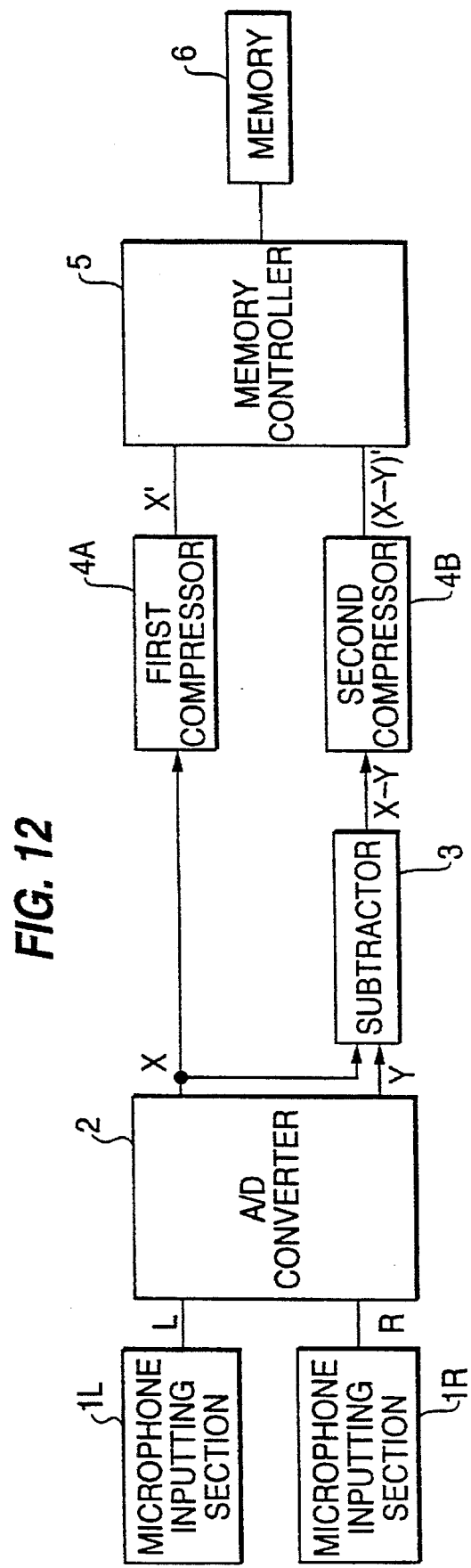
FIG. 12 is a block diagram showing a circuit configuration for a recording section for a stereophonic dictating machine according to a first example of the present invention.

FIGS. 10 and 11 show an exemplary recording section and a playback section, respectively, for a stereophonic voice recording and playback device according to a third embodiment of the present invention.

Hereinafter, a recording operation for the stereophonic voice recording and playback device will be described referring to FIG. 10.

First, stereophonic voice signals L and R are produced by a left microphone and a right microphone, respectively, in response to speech sound, and then the voice signals L and R are inputted to a sampling circuit 50, where the input signals L and R (analog signals) are converted to digital signals X and Y, respectively, as described above. The digital signals X and Y are subsequently inputted to a compressing circuit 80. The compressing circuit 80 includes a sum calculating circuit (adding circuit) 81, a first compressing section 82, a differential calculating circuit 83, a second compressing section 84, and a data writing address controlling section 85.

First, the sum calculating circuit 81 calculates the sum of the digital signals X and Y, and the resulting output (X+Y) is provided to the first compressing section 82. On the other hand, the differential calculating circuit 83 calculates the difference between the digital signale X and Y, and the resulting output (X−Y) is outputted to the second compressing section 84. By the first and second compressing sections 82 and 84, the digital signals (X+Y) and (X−Y) are compressed, respectively, thereby obtaining compressed data (X+Y)' and (X−Y)'.

The compressed data (X+Y)' and (X−Y)' are inputted to the data writing address controlling section 85. Here again, the digital signals X and Y are correlated with each other in some degree, and therefore, an information content of the digital signal (X−Y) is less than that of the digital signal (X+Y). Therefore, the second compressing section 84 can perform the compression process using less bits compared with the first compressing section 82. Therefore, the compression ratio of the second compressing section 84 is higher than that of the first compressing section 82.

As a result of the data writing address controlling section 85, the compressed data (X+Y)' end (X−Y)' are written into a location of a selected address in a memory 52. For example, the compressed data (X+Y)' is written into a more significant bits portion, and the compressed data (X−Y)' is written into a less significant bits portion. Thus, the compressed data (X+Y)' and (X−Y)' are recorded to the memory 52.

Next, a playback operation for the stereophonic voice recording and playback device will be described referring to FIG. 11.

The compressed data (X+Y)' and (X−Y)' stored in the location of the selected address in the memory 52 are read out by an expanding circuit 90 to reconstruct the original digital signals X and Y before compression. The expanding circuit 90 includes a data reading address controlling section 91, a first expanding section 92, a sum calculating circuit 93, a second expanding section 94, and a differential calculating circuit 95.

First, the data reading address controlling section 91 reads out the compressed data (X+Y)' and (X−Y)' from the memory 52, and then the compressed data (X+Y)' is outputted to the first expanding section 92, and the compressed data (X−Y)' is outputted to the second expanding section 94. By the first and second expanding sections 92 and 94, the compressed data (X+Y)' and (X−Y)' are expanded in accordance with an expansion method corresponding to the compression method used by the first and second compressing sections 82 and 84, thereby obtaining the original digital signals (X+Y) and (X−Y) before compression. Thus, the compression ratio of the second expanding section 94 corresponding to the second compression section 84 can be set higher than that of the first expanding section 92 corresponding to the first compressing section 82.

The generated digital signals (X+Y) and (X−Y) are each outputted to the sum calculating circuit 93 and the differential calculating circuit 95. The sum calculating circuit 93 calculates the sum of the (X+Y) and (X−Y), thereby generating the digital signal X. On the other hand, the differential calculating circuit 95 calculates the difference between the digital signals (X+Y) and (X−Y), thereby generating the digital signal Y. The generated digital signals X and Y are respectively outputted by the sum calculating circuit and the differential calculating circuit to a D/A converting circuit 96, where they are converted from digital to analog signals, thereby reproducing and outputting the original voice signals L and R.

Hereinafter, the present invention will be described in detail by way of illustrating examples of the above described embodiments with reference to drawings.

(EXAMPLE 1)

FIGS. 12 to 16 show a stereophonic dictating machine of an example according to the above second embodiment of the present invention (FIGS. 8 and 9).

Initially, the configuration and operation for a recording section of the stereophonic dictating machine is described with reference to FIGS. 12 to 16.

First, stereophonic voice signals L and R are produced by a left microphone inputting section 1L and a right microphone inputting section 1R, respectively, in response to speech sound, and then the voice signals L and R are inputted to an A/D converter 2. The A/D converter 2 is connected to both of the microphone inputting sections 1L and 1R. Using the A/D converter 2, the input voice signals L and R are each sampled at a predetermined sampling frequency ( e.g., 8 kHz ), and converted to digital signals X and Y, respectively.

In the present example, a delta-sigma modulation type A/D converter 180 (FIG. 14) is used as the A/D converter 2. A configuration for a circuit including such a delta-sigma modulation type A/D converter 180 will be described in detail below with reference to FIG. 14.

Figure 1:
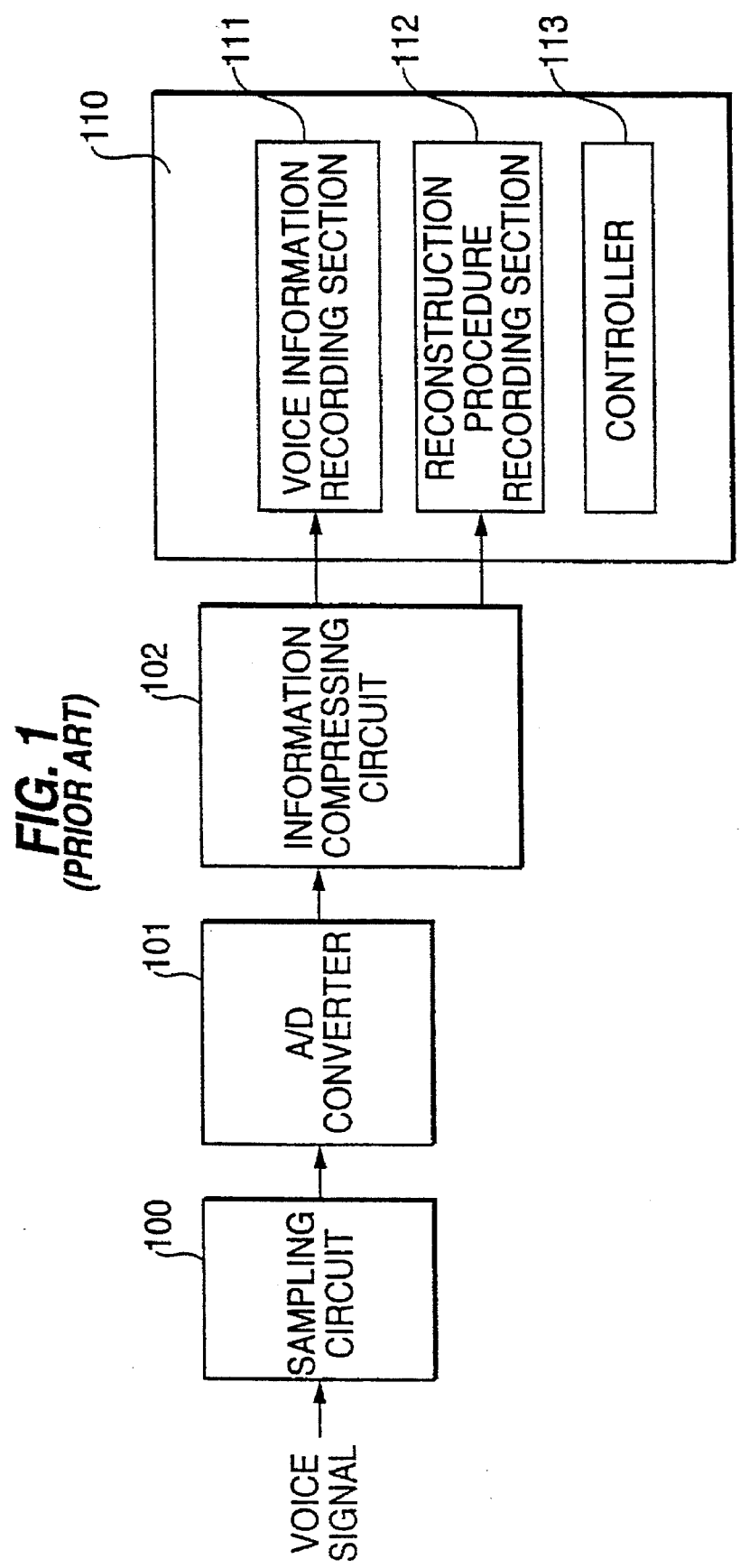
FIG. 1 is a block diagram showing a circuit configuration for a recording section for a conventional solid-state voice recording and playback device.
Figure 2:
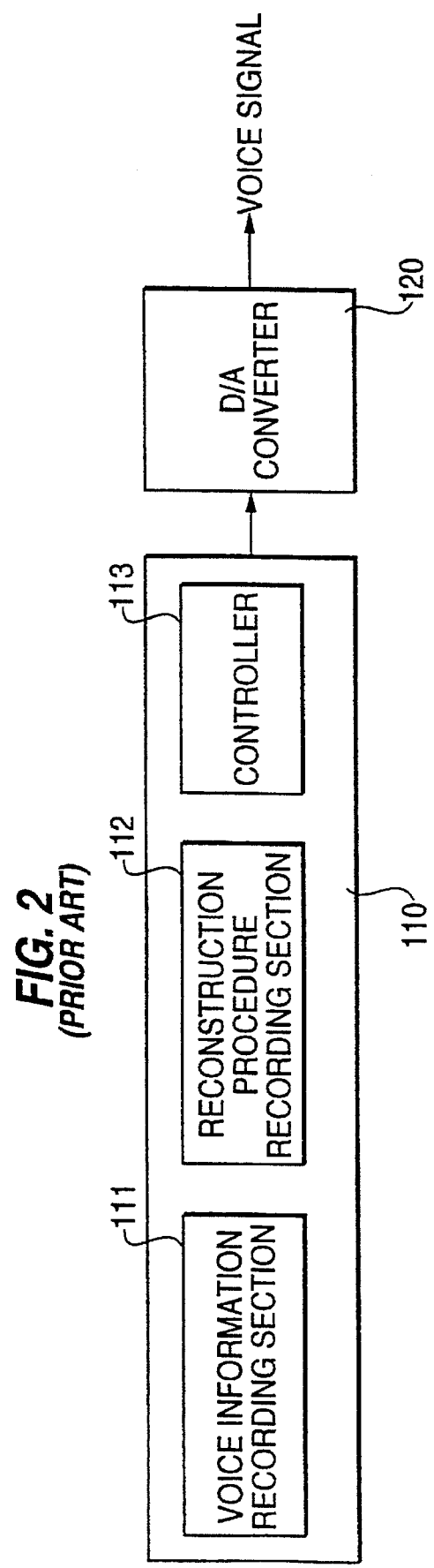
FIG. 2 is a block diagram showing a circuit configuration for a playback section for the conventional solid-state voice recording and playback device.
Figure 3:
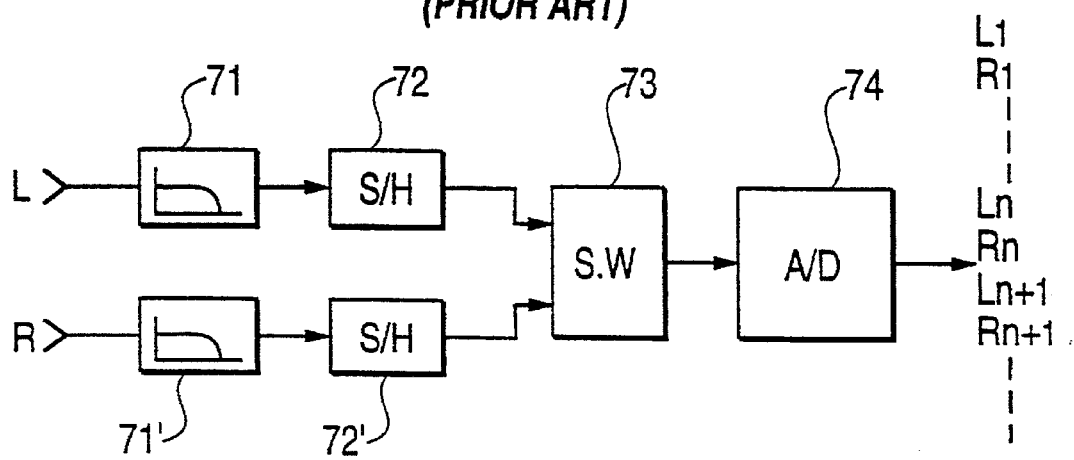
FIG. 3 is a block diagram illustrating a conventional method for converting analog signals to digital signals.
Figure 14:
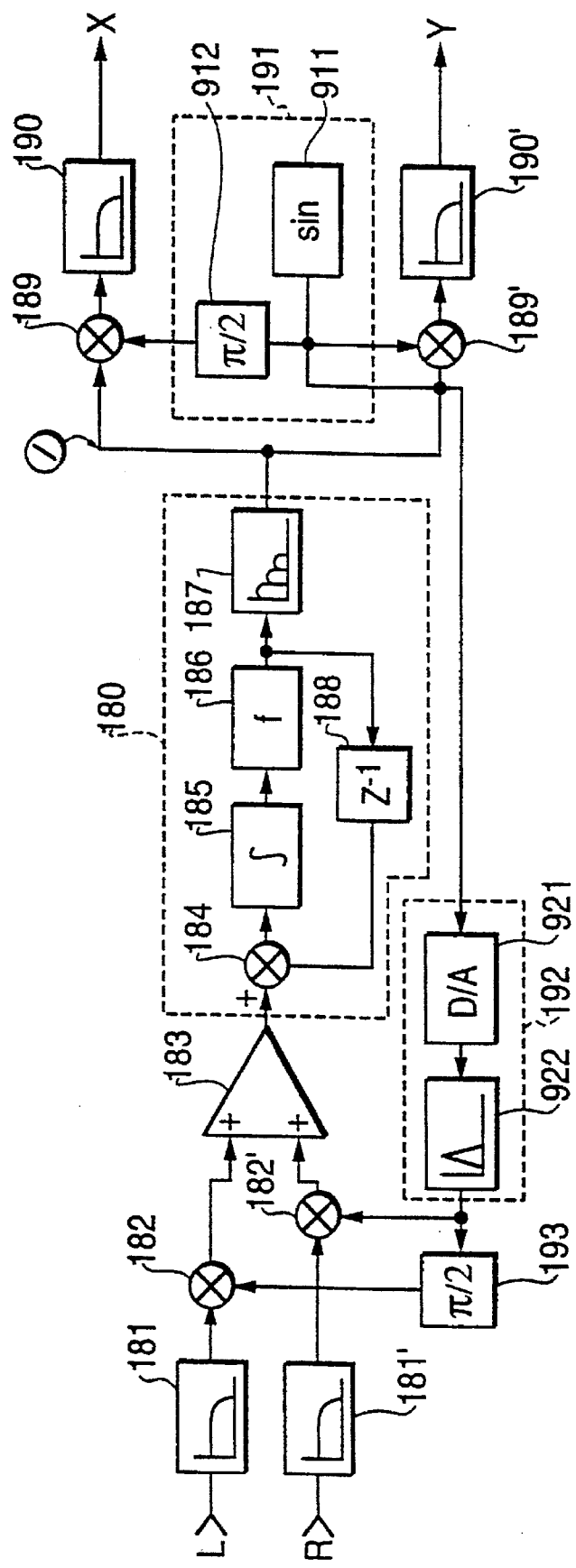
FIG. 14 is a block diagram showing a delta-sigma modulation type A/D converter according to the present invention.

As is shown in FIG. 14, the delta-sigma modulation A/D converter 180 includes an adder 184, an integrator 185, a one-bit quantizer 186, a decimation filter 187, and a delay circuit 188. Because of inclusion of the delay circuit 188, the integrator 185 and the decimation filter 187 which are affected by past values, the circuit cannot employ a switch such as that shown in FIG. 3. The other elements shown in FIG. 14 are similar to those of FIG. 6. More specifically, the analog signals L and R are passed through low-pass filters 181 and 181' respectively, to remove high frequency components (e.g., 4 kHz or more), and are then modulated by multipliers 182 and 182', respectively. Herein, a sine wave with a frequency of 4 kHz or more is obtained by converting a signal generated by a digital sine wave generating circuit 911 to an analog signal using a D/A converting circuit 192. The D/A converting circuit 192 includes a D/A converter 921 and a band-pass filter 922. By using the sine wave generated by the digital circuit, it is possible to make no difference in frequencies between a modulation mode and a demodulation mode, thereby preventing a demodulation signal from being distorted. The circuit of FIG. 14 further includes a π/2 phase shifter 193, an adder 183, multipliers 189 and 189', low-pass filters 190 and 190' having a bandwidth of w, and a sine wave generating circuit 191. The sine wave generating circuit 191 has a digital π/2 phase shifter 912 and the digital sine wave generating circuit 911.

According to the delta-sigma modulation type A/D converter 180, a signal-to-noise ratio (SNR) can be improved employing an over sampling technique using a one-bit A/D and a noise-shaving technique. To be more specific, the analog signal outputted from the adder 183 is sampled at an over sampling rate, and then noise is removed using the decimation filter 187, and finally, the sampling rate is reduced back to the normal sampling rate.

Referring again to FIG. 12, the digital signal X from the A/D converter 2 is inputted to a first compressor 4A and a subtracter 3. The digital signal Y from the A/D converter 2 is inputted to the subtracter 3. The subtracter 3 subtracts the digital signal Y from the digital signal X. The thus obtained differential digital signal (X–Y) is outputted to a second compressor 4B.

As a result of the first and second compressors 4A and 4B, the digital signals X and (X–Y) are compressed, respectively, in accordance with the above mentioned Adaptive Differential Pulse Code Modulation, thereby obtaining compressed data X' and (X–Y)'. Herein, the digital signals X and Y are correlated with each other to some extent, and therefore, an information content of the digital differential signal (X–Y) is less than that of the digital signal X. Therefore, the second compressor 4B can perform the compression process using less bits compared with the first compressor 4A, and therefore the compression ratio of the second compressor 4B is higher than that of the first compressor 4A. To be more specific, the compressing (encoding) operation is performed by the first compressor 4A using 4 bits, while it is performed by the second compressor 4B using 2 bits. Thus, compared with the case using two compressing sections having the same compression ratio, this configuration advantageously makes it possible to make recording and playback time longer using the same memory capacity.

Next, the compressed voice data X' and (X–Y)' generated by the first and second compressors 4A and 4B are supplied to a memory controller 5 to control a writing operation into a memory 6. The memory controller 5 in turn writes the compressed data X' and (X–Y)' to a location of a selected address in the memory 6. For example, the compressed data X' is written into a more significant bits portion, and the compressed data (X–Y)' is written into a less significant bits portion. Thus, the compressed data X' and (X–Y)' are recorded in the memory 6.

Figure 13:
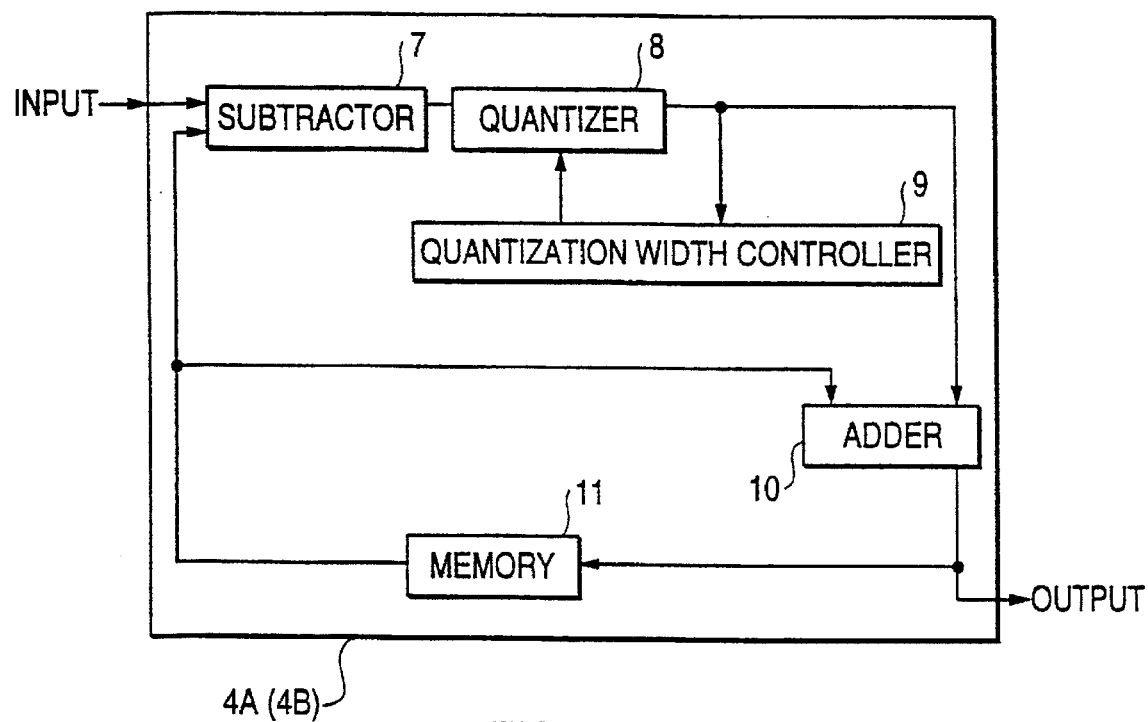
FIG. 13 is a de%ailed block diagram showing a compressor provided in the recording section of FIG. 12.

The first and second compressors 4A and 4B are identical, and it will be sufficient to describe the first compressor 4A with reference to FIG. 13.

The compressor 4A includes a subtracter 7, a quantizer 8, a quantization width controller 9, an adder 10, and a memory 11. To generate the compressed data X', the compressor 4A is operated as follows: First, the subtracter 7 calculates the difference between the true digital signal X currently supplied from the A/D converter 2 and an estimated current digital signal obtained from an digital signal one sample before which was recorded in the memory 11. The thus calculated output is supplied to a quantizer 8.

Using the quantizer 8, the input signal outputted from the subtracter 7 is quantized in accordance with a quantization width set by the quantization width controller 9. The quantization width controller 9 encodes a value quantized by the quantizer 8, and then controls the quantization width in accordance with the encoded value. The output of the quantizer 8 is inputted to the adder 10.

The adder 10 calculates the sum of the input signal from the quantizer 8 and an input digital signal one sample before to estimate the next digital signal value. The memory 11 holds a single most recent output from the adder 10.

The thus compressed data X' is written into a location of a selected address in the memory 6.

Figure 15:
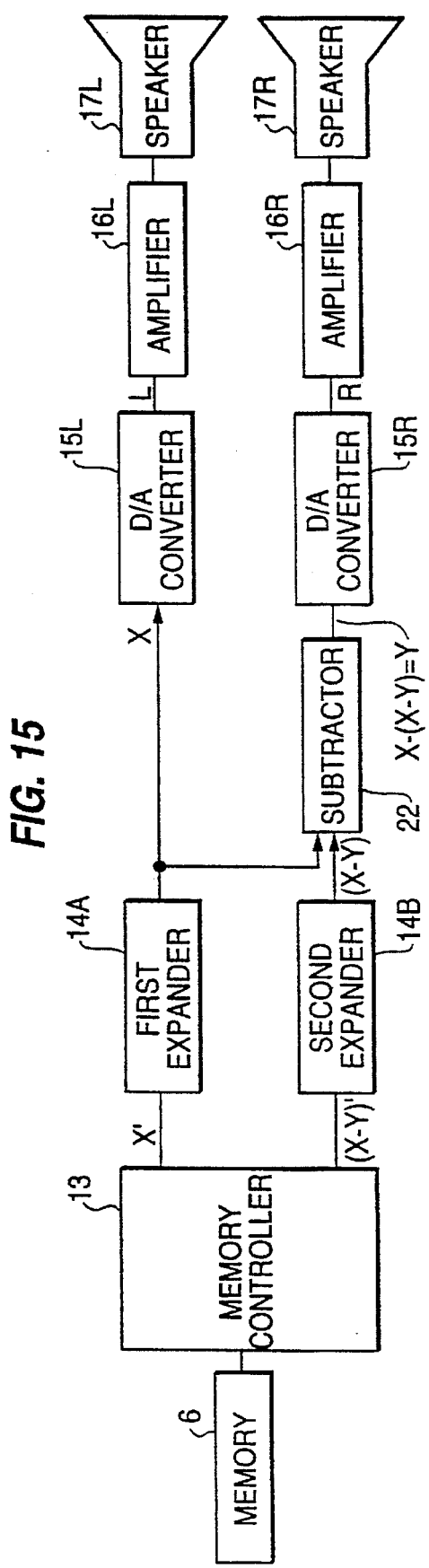
FIG. 15 is a block diagram showing a circuit configuration for a playback section for the stereophonic dictating machine according to the first example.
Figure 16:
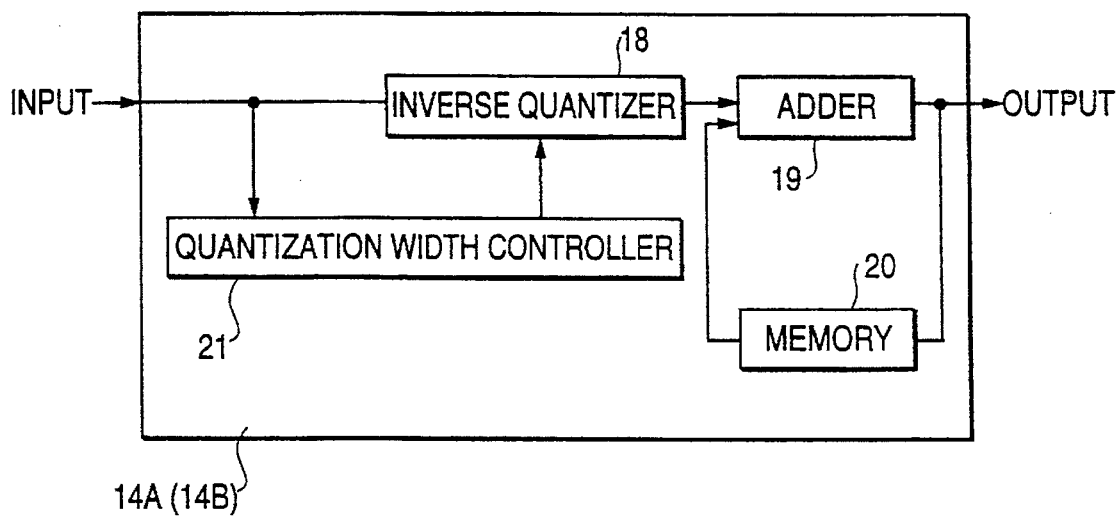
FIG. 16 is a detailed block diagram showing an expander provided in the playback section of FIG. 15.

Next, a playback operation for a playback section of the stereophonic voice recording and playback device will be described referring to FIGS. 15 and 16. The playback section includes a memory controller 13, a first expander 14A, a second expander 14B, a subtracter 22, and D/A converters 15L and 15R. The original analog voice signals L and R are reproduced by this playback section, and then are amplified by amplifiers 16L and 16R, and finally are inputted to left and right speakers 17L and 17R, respectively, thereby producing a stereophonic voice sound.

To reproduce the original analog voice signals, the compressed data X' and (X–Y)' written into the memory 6 are read out by the memory controller 13, and then are outputted to the first and second expanders 14A and 14B. By the first and second expanders 14A and 14B, the compressed data X' and (X–Y)' are expanded in accordance with an expansion method corresponding to the above compression method, thereby obtaining the original digital signals X and (X–Y) before compression. The digital signal X from the first expander 14A is inputted to the D/A converter 15L and the subtracter 22. The digital signal (X–Y) from the second expander 14B is inputted to the subtracter 22. The subtracter 22 subtracts the digital signal (X–Y) from the digital signal X, and the thus obtained output Y of the subtracter 22 is inputted to a D/A converter 15R.

Thereafter, the digital signals X and Y are converted to analog voice signals L and R by the D/A converters 15L and 15R, respectively. The thus reproduced analog voice signals L and R are outputted to amplifiers 16L and 16R, respectively. The voice signals L and R are amplified to a predetermined level using the amplifiers 16L and 16R, and then are outputted to left and right speakers 17L and 17R, respectively, thereby producing stereophonic voice sound corresponding to the voice signals.

The compression ratio of the second expander 14S corresponding to the second compressor 4B is set higher than that of the first expander 14A corresponding to the first compressor 4A. The first and second expanders 14A and 14B are identical, and it will be sufficient to describe the first expander 14A with reference to FIG. 16.

The expander 14A includes an inverse quantizer 18, an adder 19, a quantization width controller 21, and a memory 20. As a result of the inverse quantizer 18, the input signal supplied from the memory controller 13 is inversely quantized in accordance with a quantization width set by the quantization width controller 21, and then is outputted to the adder 19. The adder 19 calculates the sum of the input signal from the inverse quantizer 18 and an output signal one sample before, which is an output value read out from the memory 20. The thus resulting value is outputted to the subtracter 22 and the D/A converter 15L. Herein, the memory 20 holds a single most recent previous output from the adder 19.

The A/D converter 2, the compressors 4A and 4B, the memory 6, and the expanders 14A and 14B are preferably integrated on a substrate such as a silicon substrate.

The above configuration makes it possible to realize a stereophonic dictating machine at a low production cost.

(EXAMPLE 2)

FIGS. 17 to 20 show a more detailed example of a stereophonic dictating machine according to the above third embodiment of the present invention. The stereophonic dictating machine of this second example is generally the same as that of the first example with the exception that adders 30 and 31 are additionally provided in a recording section and a playback section, respectively. Therefore, in FIGS. 17 to 20, similar elements are indicated by the same reference numbers of FIGS. 12 to 16 and the description thereof will be omitted.

Figure 18:
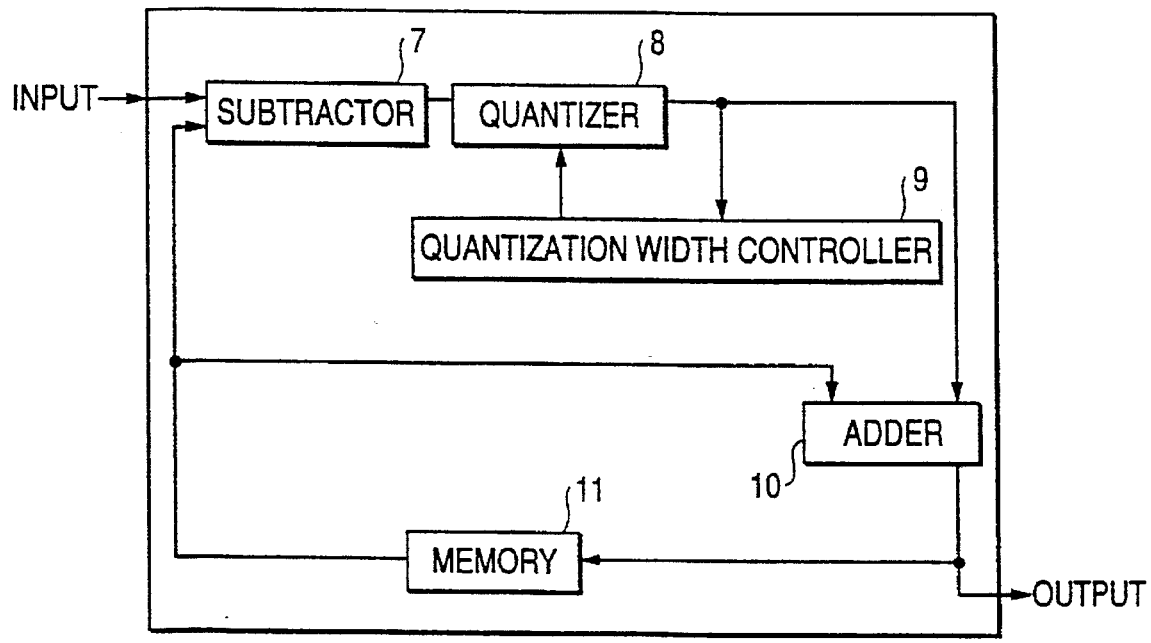
FIG. 18 is a detailed block diagram showing a compressor provided in the recording section of FIG. 17.

As shown in FIGS. 17 and 18, the digital signals X and Y from an A/D converter 2 are inputted to the adder 30. The adder 30 calculates the sum of the input signals X and Y, and the resulting output (X+Y) is outputted to a first compressor 4A. Herein, the A/D converter 2 is the same as that described in the first example.

Figure 20:
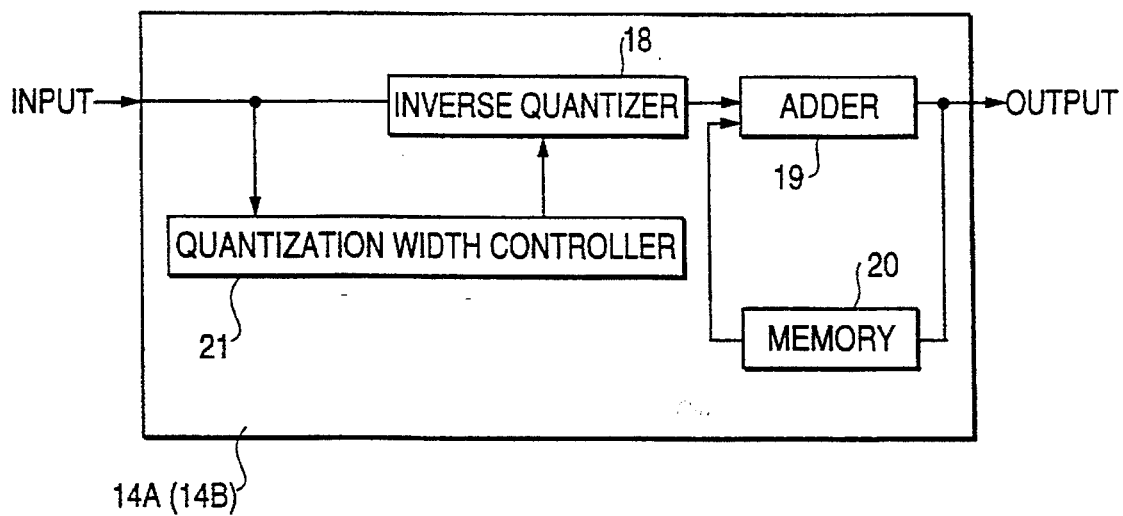
FIG. 20 is a detailed block diagram showing an expander provided in the playback section of FIG. 19.
Figure 19:
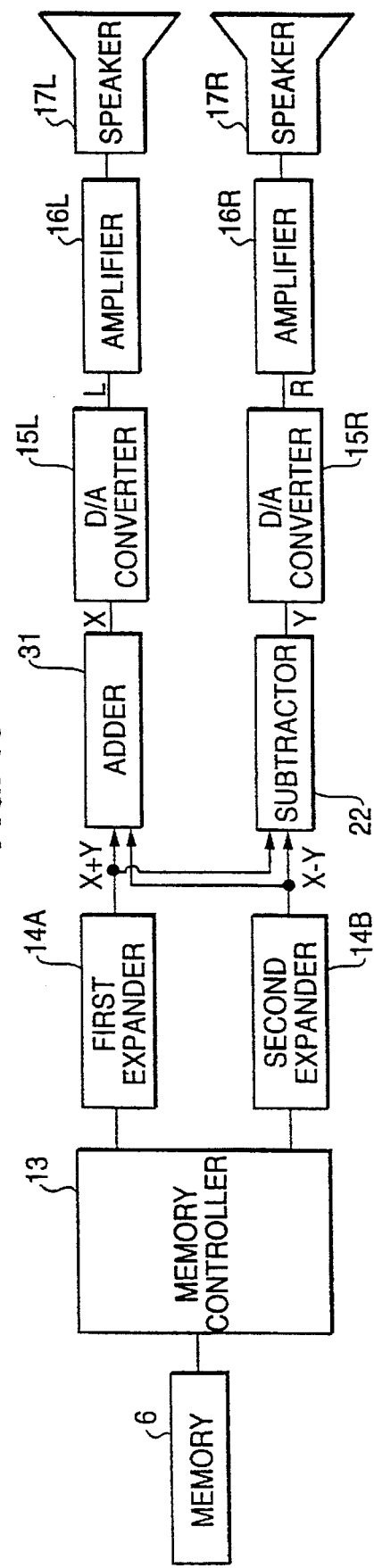
FIG. 19 is a block diagram showing a circuit configuration for a playback section for the stereophonic dictating machine according to the second example.

As described in the first example, the subtracter 3 subtracts the signal Y from the signal X, and the resulting output (X−Y) is outputted to a second compressor 4B. Accordingly, in the present example, a memory controller 5 writes the compressed data (X+Y)' and (X−Y)' into a memory 6. On the other hand, as shown in FIGS. 19 and 20, the compressed data (X+Y)' and (X−Y)' are read out by a memory controller 13, and subsequently are expanded by first and second expanders 14A and 14B, respectively, thereby obtaining digital signals (X+Y) and (X−Y). The thus obtained digital signals (X+Y) and (X−Y) are outputted to the adder 31. Then, the adder 31 adds the digital signal (X+Y) to the digital signal (X−Y). The resulting output X is inputted to a D/A converter 15L, to thereby playback the original voice signal L. The thus reproduced voice signal L is inputted to an amplifier 16L and then to a speaker 17L, thereby producing a voice sound.

On the other hand, the digital signals (X+Y) and (X−Y) are outputted to a subtracter where (X−Y) is subtracted from (X+Y). The thus resulting output Y is inputted to a D/A converter 15R, thereby reproducing the original voice signal R. The thus reproduced voice signal R is inputted to an amplifier 16R and then to a speaker 17R, thereby producing a voice.

As shown in FIGS. 18 and 20, the compressors 4A and 4B and the expanders 14A and 14B are the same as those described in detail in the first example.

In a manner similar to that of the first example, the compression ratio of the second compressor 4B is higher than that of the first compressor 4A, and the compression ratio of the second expander 14B is higher than that of the first expander 14A.

(EXAMPLE 3)

FIGS. 21 to 24 show a detailed example of a stereophonic dictating machine according to the first embodiment of the present invention. The stereophonic dictating machine of the third example is generally the same as that of the first or the second example with the exception that no adder or subtracter is included in a recording section or a playback section. Therefore, in FIGS. 21 to 24, similar elements are indicated by the same reference numbers of FIGS. 12 to 16 and the description thereof will be omitted.

Figure 23:
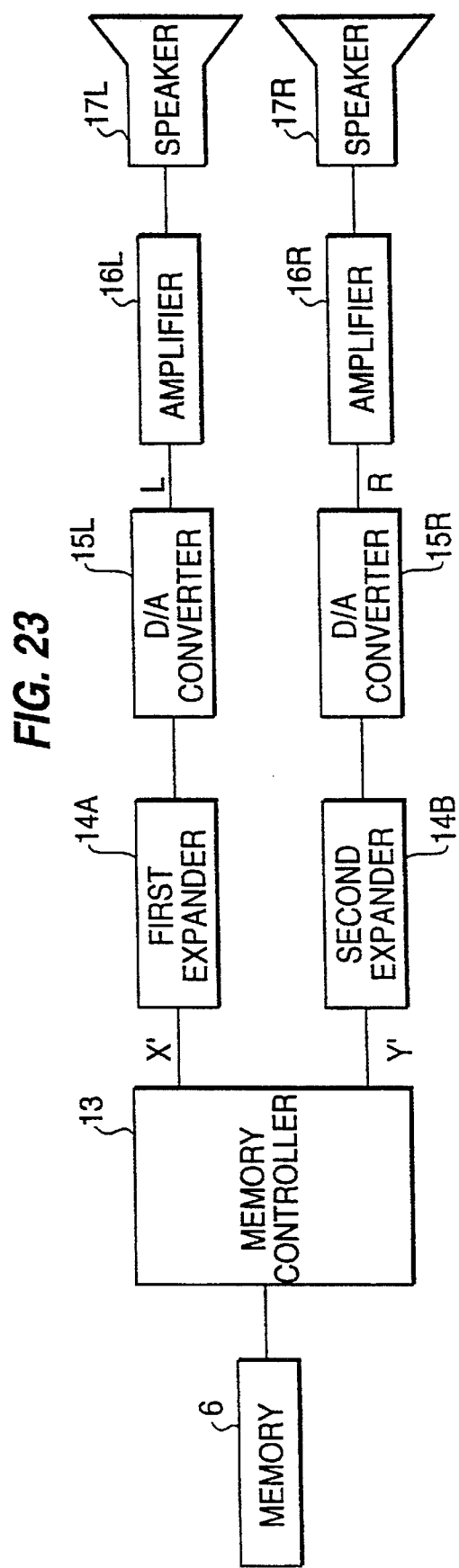
FIG. 23 is a block diagram showing a circuit configuration for a playback section for a stereophonic dictating machine according to the third example.

As shown in FIGS. 21 and 23, an analog voice signal L is produced by a microphone inputting section 1L in response to speech sound, and then the voice signal L is outputted to an A/D converter 2, where it is converted to a digital signal X. Then the digital signal X is compressed using a first compressor 4A. The compressed data X' is written into a location of a selected address in a memory 6 using a memory controller 5. Subsequently, the compressed data X' is read out from the memory 6 by a memory controller 13 as shown in FIG. 23, and then is expanded using a first expander 14A. The expanded digital signal X is converted to the original analog signal L using a D/A converter 15L. Next, the reproduced analog signal L is amplified using an amplifier 16L and then is outputted to a speaker 17L.

Similarly, an analog voice signal R is produced by a microphone inputting section 1R in response to speech sound, and then the voice signal R is outputted to the A/D converter 2, where it is converted to a digital signal Y. Then the digital signal Y is compressed by a second compressor 4B. The thus compressed data Y' is written into a location of a selected address in the memory 6 using the memory controller 5. Subsequently, the compressed data Y' is read out from the memory 6 using the memory controller 13, and then is expanded using a second expander 14B. The expanded digital signal Y is converted to the original analog signal R using a D/A converter 15R. Next, the thus reproduced analog signal R is amplified using an amplifier 16R and then is outputted to a speaker 17R.

Figure 22:
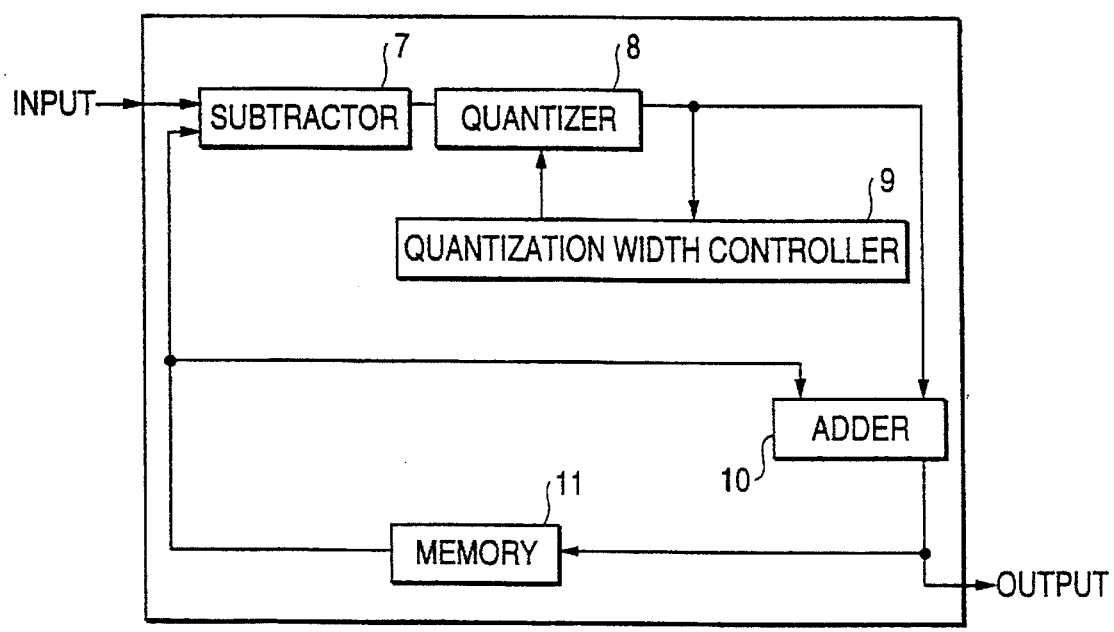
FIG. 22 is a detailed block diagram showing a compressor provided in the recording section of FIG. 21.
Figure 24:
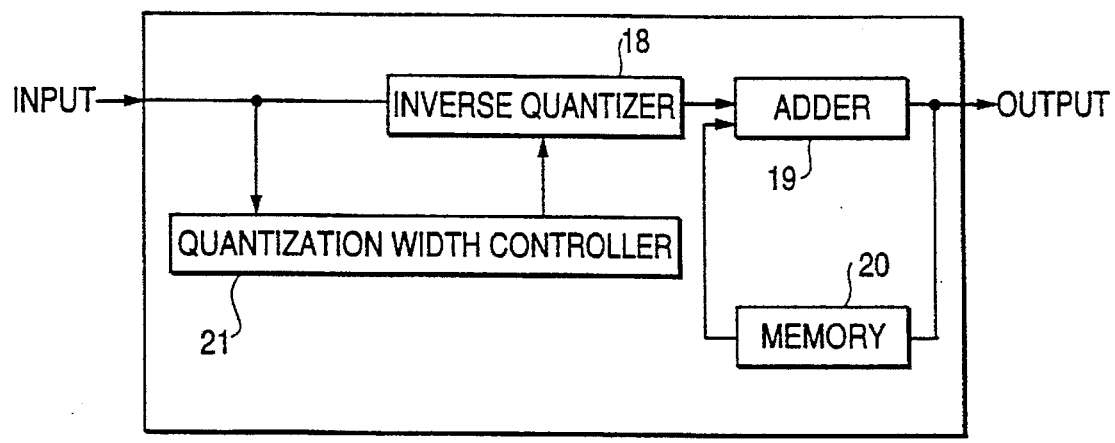
FIG. 24 is a detailed block diagram showing an expander provided in the playback section of FIG. 23.

As shown in FIGS. 22 and 24, the compressors 4A and 4B and the expanders 14A and 14B are the same as those described in the first and second examples. According to the present example, the configuration can be simplified compared with the first and second examples.

The stereophonic voice recording and playback devices of the present invention can be applied to a communication recording and playback apparatus such as a stereophonic dictating machine.

According to such a communication recording and playback apparatus, it is possible to clearly recognize a position of each speaker compared with the case of a monophonic voice recording and playback device, thereby readily determining who speaks.

In addition, according to the present invention, the data compression ratio can be increased compared with a conventional solid-state stereophonic voice recording and playback device, which makes it possible to make recording and playback duration longer with the same memory capacity.

In addition, according to the stereophonic voice recording and playback device of the present invention, monophonic voice signals can also be recorded and reproduced, thereby expanding the application thereof.

Furthermore, the required number of controllers for the data writing operation and that for the data reading operation can each be reduced to one, which makes it possible to provide a stereophonic voice recording and playback device with a simplified configuration at a low production cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A stereophonic voice recording and playback device for stereophonically recording and reproducing voice signals, comprising:

adding means for receiving a first channel analog voice signal and a second channel analog voice signal, performing quadrature conversion of said respective analog voice signals, and adding said quadrature converted signals to produce an added signal;

an analog/digital converter for receiving said added signal from said adding means and converting said added signal to a digital signal;

compressing means for receiving said digital signal from said analog/digital converter and compressing said digital signal;

memory means for storing said compressed digital signal; and expanding means for accessing said digital signal from said memory means and reproducing a stereophonic signal in accordance with the accessed digital signal; and means for dividing said digital signal converted by said analog/digital converter into a first digital signal corresponding to said first channel analog voice signal and a second digital signal corresponding to said second channel analog voice signal, said compressing means including a compressing section for compressing one of said first and second digital signals, differential calculating means for calculating the difference between said first and second digital signals, a differential compressing section for compressing said difference calculated by said differential calculating means, and data writing means for writing data compressed by said compressing section and data compressed by said differential compressing section into said memory means.

2. A stereophonic voice recording and playback device according to claim 1, wherein the compression ratio of said compressing section and the compression ratio of said differential compressing section are different from each other.

3. A stereophonic voice recording and playback device according to claim 1, wherein said data writing means writes both of said data compressed by said compressing section and said data compressed by said differential compressing section into one address in said memory means.

4. A stereophonic voice recording and playback device according to claim 3, further comprising data reading means for reading out said data compressed by said compressing section and said data compressed by said differential compressing section both written into one address in said memory means.

5. A stereophonic voice recording and playback device according to claim 1, wherein said expanding means comprises:

data reading means for reading out said data compressed by said compressing section and said data compressed by said differential compressing section written into said memory means;

a first expanding section and a second expanding section for independently expanding said data compressed by said compressing section and said data compressed by said differential compressing section read out by said data reading means; and second differential calculating means for calculating the difference between data expanded by said first expanding section and data expanded by said second expanding section.

6. A stereophonic voice recording and playback device according to claim 5, wherein the compression ratio of said first expanding section and the compression ratio of said second expanding section are different from each other.

\* \* \* \* \*